United States Patent Office 3,573,183
Patented Mar. 30, 1971

3,573,183
IRRADIATION POLYMERIZATION OF ETHYLENE USING A TERTIARY BUTYL ALCOHOL MEDIUM
Tsutomu Kagiya, Kyoto-shi, and Hiroshi Mitsui, Sueo Machi, Fujo Suganuma, and Miyuki Hagiwara, Takasaki-shi, Japan, assignors to Japan Atomic Energy Research Institute
No Drawing. Filed Nov. 24, 1967, Ser. No. 685,256
Claims priority, application Japan, Nov. 25, 1966, 41/76,857
Int. Cl. C08d 1/04, 3/02
U.S. Cl. 204—159.22      9 Claims

ABSTRACT OF THE DISCLOSURE

This invention is directed to the radiation induced polymerization of ethylene in which tertiary butyl alcohol is used as the reaction medium. Various solvents have been considered as a reaction medium for the radiation induced polymerization of ethylene to be carried out under high reaction pressure, and it has been found that tertiary butyl alcohol is the medium which produces high molecular weight products in high yield and gives the greatest rate of polymerization reaction.

BACKGROUND OF THE INVENTION

The radiation induced polymerization of ethylene is known per se. That is to say, it is known that ethylene can be polymerized by means of any of the ionizing radiations including electromagnetic waves such as gamma rays or X-rays and corpuscular radiations such as beta rays, alpha rays or beams of fission fragments. (Cf. A. Chapiro: "Radiation Chemistry of Polymeric System," 1962, Interscience, pp. 1–36).

It is also known that in the radiation induced polymerization of ethylene at low pressure of the order of several tens atmospheres, the rate of the polymerization reaction can be increased by addition of a suitable solvent.

However, the low pressure process is of little commercial value, because the rate of the polymerization reaction, G-value and molecular weight of produced polymer are generally low. On the other hand, in the high pressure radiation induced polymerization of ethylene, when the reaction pressure is raised to several hundred atmospheres, the rate of polymerization reaction, G-value and molecular weight of the produced polymer are remarkably increased, and thus the high pressure process has more industrial importance. However, under such high pressures, if a solvent is used as the reaction medium, the rate of polymerization reaction and molecular weight of produced polymer are drastically decreased. But, it is necessary to use a medium or a solvent for removing the accumulated reaction heat and for discharging the produced polyethylene continuously out of the reactor in which the ethylene is polymerized.

In order to solve this problem, we have minutely studied the radiation induced polymerization reaction using various kinds of solvents for the reaction medium, and have found that both the rate of polymerization reaction and the molecular weight of the polyethylene produced can be increased by using tertiary butyl alcohol as the medium. Further, it was discovered that tertiary butyl alcohol is very stable against ionizing radiations.

SUMMARY OF THE INVENTION

This invention relates to a process for polymerizing ethylene under high pressure by means of an ionizing radiation in which tertiary butyl alcohol is used as the reaction medium which serves the dual functions of removing the reaction heat and discharging the polymerized product out of the reactor.

In the process of this invention, the tertiary butyl alcohol is used alone or in the form of a mixture with water or liquefied carbon dioxide (which is a desirable reaction medium for producing polyethylene in the form of powder). If the prevention of adherence of produced polymer to the inside wall of the reactor or pipe lines is a matter of special consideration, the use of the mixture with water or carbon dioxide is preferred. The medium or solvent may exist in the reactor mixed with ethylene either completely homogeneously or only partially. That is, tertiary butyl alcohol dissolves monomeric ethylene, but a mixture thereof with a substantial amount of water does not dissolve ethylene.

The amount of the medium to be used is 5–70% of the total volume of the reactor. When a mixed medium is used, there must exist tertiary butyl alcohol at least in an amount of 5% of the volume of the reactor.

The dose rate to be employed is $10^3$ per hour or more, and the preferred range is $10^4$–$10^6$ roentgens per hour. The temperature at which irradiation is carried out is within the range 0° C.–120° C. The latter temperature is the approximate melting temperature of the produced polyethylene. This process can be carried out under a pressure of several atmospheres or more, but it is preferable to employ a high pressure of more than 100 atmospheres. As the reaction pressure increases, the rate of the polymerization reaction increases remarkably. However, a suitable reaction pressure will be determined by considering economy in providing the high pressure reactor.

The process of this invention can be applied to both a continuous production system and a batch process. The product of the process of this invention is quite excellent as a plastic material.

DETAILED DESCRIPTION OF THE EMBODIMENTS

Now the invention is illustrated by examples of the experiments and the embodiments.

Experiment 1

A stainless steel high pressure reactor (autoclave) of 100 ml. content was charged with 50 ml. of each of the solvents listed in Table 1. After the air in the reactor was completely purged, ethylene was introduced into the reactor until the internal pressure reached 300 atmospheres at 23° C. This is equivalent to about 30 g. of ethylene. The reaction mixture was irradiated with gamma radiation from cobalt-60 at a dose rate of $2.5 \times 10^4$ roentgens per hour for 1 hour at the same temperature.

The yield of the produced polymers and their average molecular weights are shown in Table 1. It is apparent that when tertiary butyl alcohol is used as the solvent, the yield of the polymer and its molecular weight are greater than when any other solvent is used.

TABLE 1

| Solvent | Yield of polymer (g.) | Molecular weight of polymer |
|---|---|---|
| No solvent | 0.30 | 130,000 |
| Water | 0.21 | 110,000 |
| Methanol | 0.25 | 9,900 |
| Acetone | 0.10 | 1,000 |
| n-Hexane | 0.03 | 5,000 |
| Cyclohexane | 0.17 | 3,000 |
| Ethyl ether | 0.12 | 1,900 |
| Toluene | 0.03 | 3,700 |
| Ethyl acetate | 0.20 | 7,300 |
| t-Butyl alcohol | 0.40 | 70,000 |

Experiment 2

Using the same reactor as in Experiment 1, the amount of tertiary butyl alcohol to be used in the process of this invention was checked. The irradiation conditions are the same as in Experiment 1.

TABLE 2

| Amount of t-Butyl alcohol (ml.) | Amount of ethylene (g.) | Pressure (kg./cm.²) | Yield of polymer (g.) | Mol. wt. of polymer |
|---|---|---|---|---|
| 0 | 43 | 300 | 0.30 | 13.0×10⁴ |
| 5 | 43 | 300 | 0.47 | 12.5×10⁴ |
| 10 | 42 | 300 | 0.49 | 11.8×10⁴ |
| 30 | 38 | 300 | 0.54 | 9.0×10⁴ |
| 50 | 31 | 300 | 0.40 | 7.0×10⁴ |
| 70 | 23 | 300 | 0.36 | 4.3×10⁴ |

At least 5% by volume of tertiary butyl alcohol is necessary, while at least 30% of the volume of the reactor will have to be reserved for ethylene.

Experiment 3

Using the same reactor, the composition and the amount of the water-tertiary butyl alcohol mixture to be used in the process of this invention was checked. The irradiation conditions are the same as in Experiment 1.

TABLE 3

| Water/alcohol mole ratio | Total amount of the mixture (ml.) | Amount of ethylene (g.) | Pressure (kg./cm.²) | Yield of polymer (g.) | Mol. wt. of polymer |
|---|---|---|---|---|---|
|  | 0 | 45 | 400 | 0.64 | 28×10⁴ |
| 0 | 10 | 44 | 400 | 0.80 | 16.0×10⁴ |
| 0.7 | 10 | 43 | 400 | 0.78 | 21.0×10⁴ |
| 4 | 10 | 41 | 400 | 0.72 | 23.1×10⁴ |
| ∞ | 10 | 41 | 400 | 0.55 | 25.0×10⁴ |
| 0.7 | 30 | 36 | 400 | 0.83 | 18.0×10⁴ |
| 30 ¹ | 10 | 41 | 400 | 0.61 | 24.0×10⁴ |

¹ The amount of tertiary butyl alcohol is approximately equivalent to 5% of the volume of the reactor.

The state of the reaction mixture is not clearly known, since the inside of the reactor cannot be observed. However, it is believed that the following occurs: When there exists no water, the reaction mixture exists in the reactor in a homogeneous state which cannot be considered to be either liquid or gaseous. When a substantial amount of water exists, there will be a liquid phase mainly comprising water and the butyl alcohol besides the above-mentioned homogeneous phase.

Experiment 4

Using the same reactor, the use of tertiary butyl alcohol as the solvent was studied when carbon dioxide is used as the reaction medium. The irradiation conditions are the same as in Experiment 1.

TABLE 4

| Amount of t-Butanol (ml.) | Amount of CO₂ (g.) | Amount of ethylene (g.) | Pressure (kg./cm.²) | Yield of polymer | Mol. wt. of polymer |
|---|---|---|---|---|---|
| 0 | 5 | 43.7 | 300 | 0.19 | 15.2×10⁴ |
| 10 | 5 | 35.2 | 300 | 0.32 | 12.3×10⁴ |
| 0 | 20 | 40.0 | 300 | 0.13 | 7.3×10⁴ |
| 5 | 20 | 39.0 | 300 | 0.18 | 7.0×10⁴ |
| 10 | 20 | 33.0 | 300 | 0.21 | 6.0×10⁴ |
| 0 | 45 | 29.7 | 300 | 0.10 | 5.2×10⁴ |
| 10 | 45 | 23.4 | 300 | 0.20 | 4.5×10⁴ |

Ethylene, tertiary butyl alcohol and $CO_2$ form a homogeneous liquid phase when pressure is fully applied to at a temperature lower than the critical temperature of $CO_2$. In the cases of Experiment 4, the reaction mixture is believed to be in a state that is neither liquid nor gaseous as stated above.

Example 1.—The same reactor as used in the experiments was charged with 40 ml. of t-butyl alcohol, and ethylene was introduced therein and the internal pressure was 400 atmosphere at 30° C. The amount of the ethylene is equivalent to about 35 g.

The reaction mixture was irradiated with gamma radiation from cobalt-60 at a dose rate 1.3×10⁵ roentgens per hour for 1 hour at 30° C. A white solid substance was obtained in the form of a slurry. After being separated from the solvent, the substance weighed 1.9 g. and had an infrared absorption spectrum revealing that hte substance is pure polyethylene. Its molecular weight was 155,000, its specific gravity was 0.93 and its crystallinity was 65%.

Incidentally, when ethylene was polymerized under the same conditions as the above except that no t-butyl alcohol was added, the yield of the polyethylene was 1.4 g., its average molecular weight was 280,000, its specific gravity was 0.93 and its crystallinity was 65%.

Example 2.—The same reactor as used in Example 1 was charged with 10 ml. of a 60% by volume aqueous solution of t-butyl alcohol, and ethylene was introduced into the reactor and the internal pressure was 400 atmosphere at 30° C. The amount of ethylene is equivalent to about 43 g. The reaction mixture was irradiated with gamma radiation from cobalt-60 at a dose rate 1.7×10⁵ roentgens per hour for 1 hour at 30° C. Polyethylene (2.4 g.) was obtained. The molecular weight of this polyethylene was 140,000. Yield of the polyethylene produced under the same conditions without solvent being added was 2.0 g. Its average molecular weight was 300,000.

Example 3.—The same reactor as used in Example 2 was charged with 10 ml. of t-butyl alcohol. Ethylene (25 g.) containing 20 mol percent of carbon dioxide was introduced into the reactor and the internal pressure was 400 atmospheres at 30° C. The reaction mixture was irradiated with gamma radiation from cobalt-60 at a dose rate 2.5×10⁴ roentgens per hour for 1 hour at 30° C. Polyethylene (0.47 g.) was obtained. Its molecular weight was 120,000.

Yield of the polyethylene polymerized under the same conditions without butyl alcohol was 0.37 g. and its molecular weight was 150,000.

We claim:

1. A process for polymerizing ethylene comprising irradiating ethylene with high energy ionizing radiation under a pressure of at least 100 atmospheres and a temperature between 0 and 120° C. in a reaction medium including tertiary butyl alcohol serving to promote the polymerization reaction, removing the heat produced during the polymerization reaction via said reaction medium, and recovering the polymerized product.

2. A process as claimed in claim 1, in which the reaction is effected in a reactor and the reaction medium is used in an amount corresponding to 5–70 volume percent of the volume of the reactor, the remainder being ethylene.

3. A process as claimed in claim 2, in which the reaction medium includes water mixed with the tertiary butyl alcohol, and said tertiary butyl alcohol occupying at least 5% of the volume of the reactor.

4. A process as claimed in claim 2, in which the reaction medium includes carbon dioxide mixed with the teritary butyl alcohol, and said tertiary butyl alcohol occupying at least 5% of the volume of the reactor.

5. A process as claimed in claim 4, wherein the carbon dioxide is liquefied.

6. A process as claimed in claim 2, wherein the reaction medium is constituted in entirety of tertiary butyl alcohol.

7. A process as claimed in claim 1, wherein the dose rate of the radiation is at least 10³ roentgens per hour.

8. A process as claimed in claim 1, wherein the reaction is effected in a reactor and the tertiary butyl alcohol is present in an amount representing at least 5% of the volume of the reactor, the ethylene being present in an amount representing at least 30% of the volume of the reactor.

9. The process as claimed in claim 1 wherein the ionizing radiation is gamma radiation.

References Cited
UNITED STATES PATENTS 2,409,996 10/1946 Roedel _____ 260—94.9
2,467,234 4/1949 Sargent et al. _____ 260—94.9

FOREIGN PATENTS 835,121 5/1960 Great Britain.

MURRAY TILLMAN, Primary Examiner
R. B. TURER, Assistant Examiner

U.S. Cl. X.R.
260—94.9